Aug. 8, 1950 J. D. REARDON ET AL 2,518,252
PROJECTION MICROSCOPE
Filed Dec. 29, 1948 3 Sheets-Sheet 1

INVENTORS
JOSEPH D. REARDON
LESLIE J. PETERS
BY
ATTORNEYS

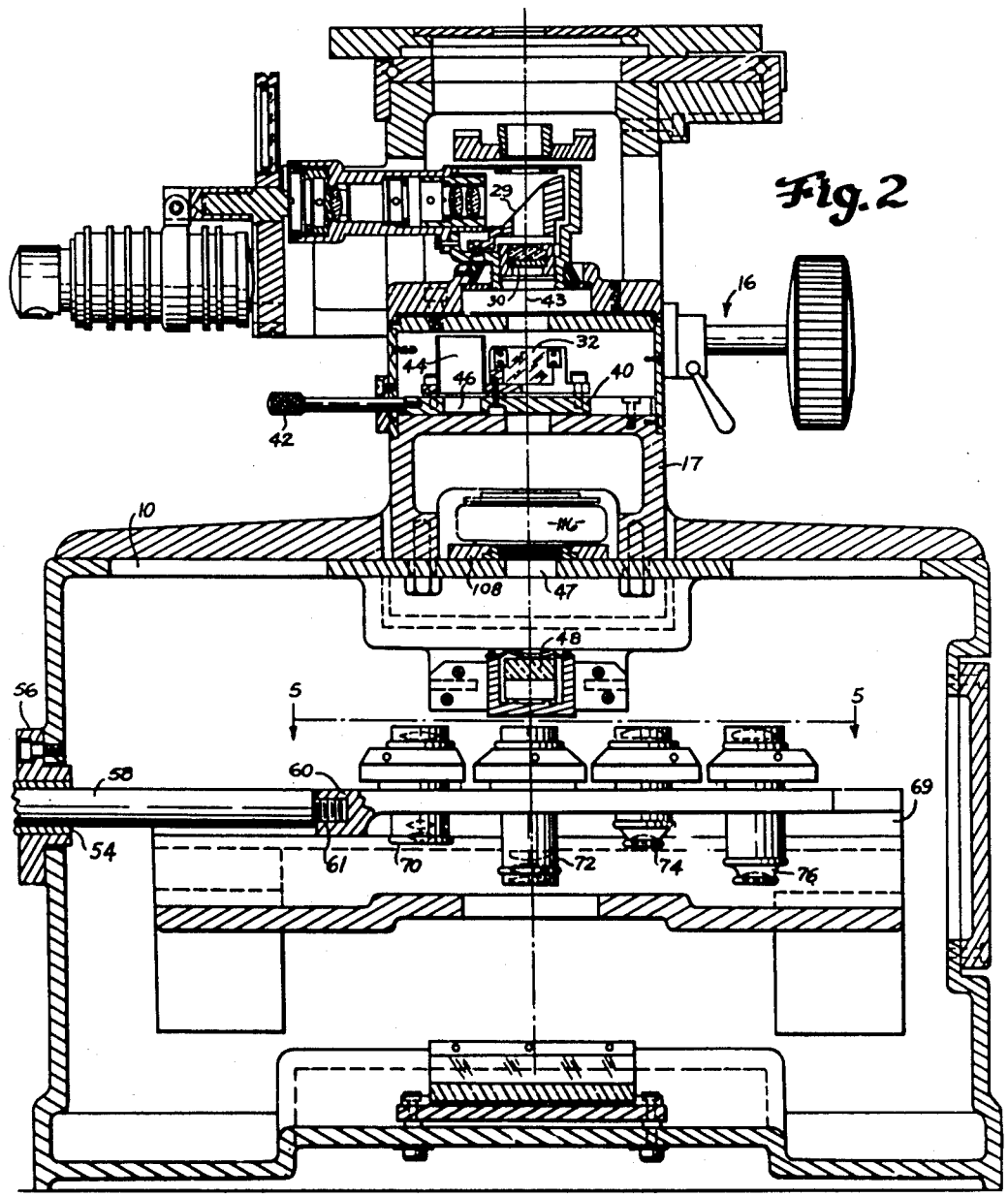

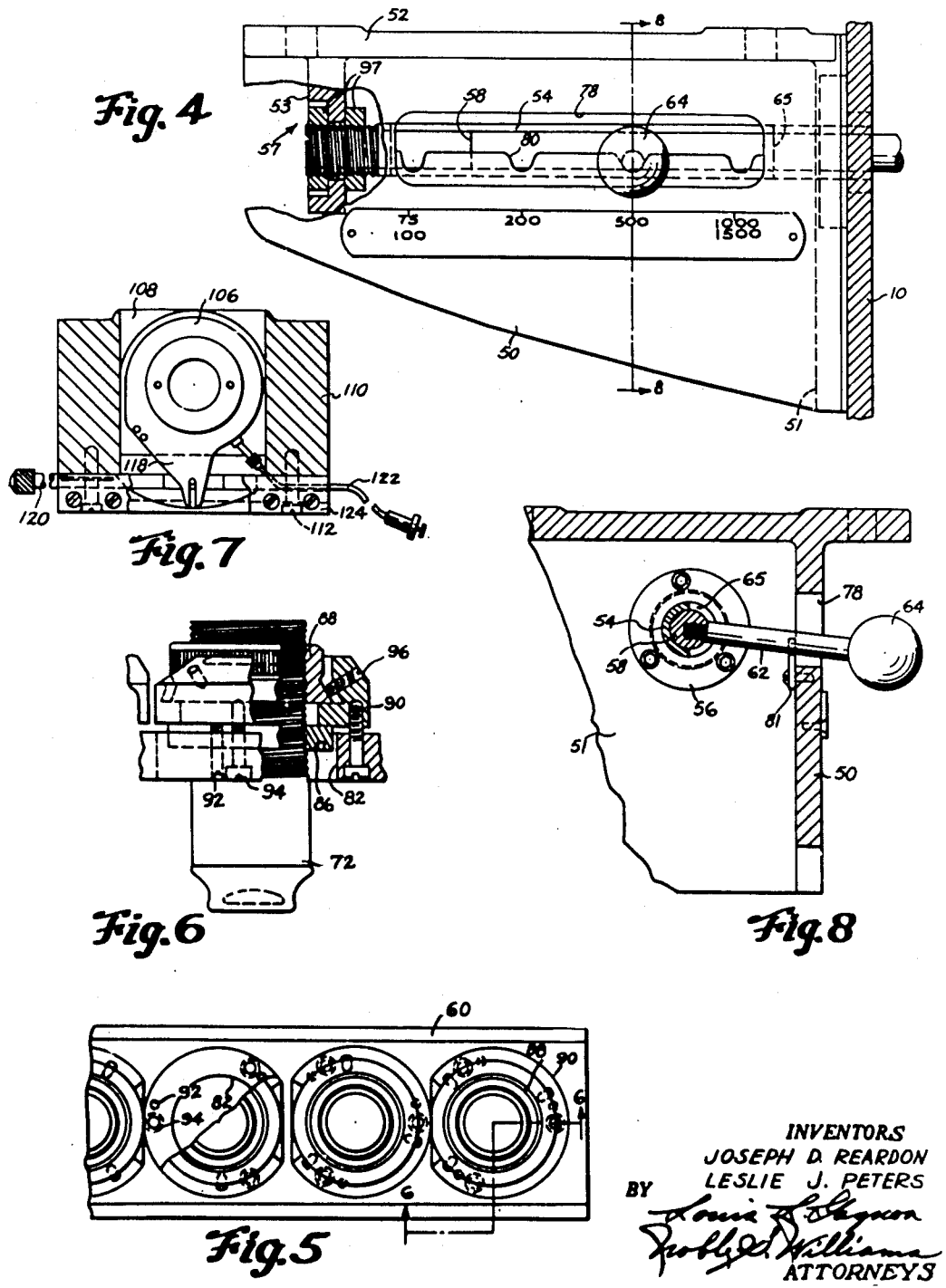

Patented Aug. 8, 1950

2,518,252

UNITED STATES PATENT OFFICE 2,518,252

PROJECTION MICROSCOPE

Joseph D. Reardon, Snyder, and Leslie J. Peters, Buffalo, N. Y., assignors to American Optical Company, Southbridge, Mass., a voluntary association of Massachusetts Application December 29, 1948, Serial No. 68,014

14 Claims. (Cl. 88—24)

This invention relates to projection microscopes of the metallographic type. More particularly, it relates to improvements in such instruments whereby any one of a plurality of projection objectives may be selectively and accurately positioned in the device so as to function with other optical elements thereof for projecting enlarged images of exact predetermined magnifications of an opaque specimen, or the like, upon a viewing screen or image receiving plate predeterminedly positioned in accordance with the objective being used.

In co-pending application 763,594, filed August 25, 1947, a metallographic type instrument is shown in which any one of a plurality of microscope parfocalized objectives may be readily positioned in operative relation to an opaque specimen upon a supporting stage. The specimen is illuminated by light from a laterally disposed light source, which light is reflected by a semi-transparent reflector toward the objective focused upon the specimen. Thereafter light from the specimen is directed by this objective as a parallel beam through the semitransparent reflector and toward a relatively long focal length telescope lens aligned therewith. The combination of objective and telescope lenses is, in turn, adapted to form an image of the specimen at a predetermined distance therefrom which image may be either at a first predetermined focal plane located in a laterally disposed body tube member of the instrument or at a second predetermined focal plane located within a lower hollow housing of the instrument, depending upon the position of an intermediate reflector provided for intercepting the image forming beam. The first mentioned focal plane, however, must coincide with the location of the object plane of the interchangeable matched eye lenses employed in the body tube and proper axial adjustment of the telescope lens will cause said first predetermined focal plane to be moved into co-incidence with the object plane of the eye lenses, without disturbing the parfocalization of the microscope objectives. Accordingly, different parfocalized microscope objectives upon the turret of the instrument may be selectively swung into alignment with the specimen for forming images of different predetermined magnifications at said first predetermined focal plane, and thus when matched eye pieces of different magnifications are slipped into the body tube, enlarged virtual images of predetermined magnifications may be observed by the operator of the instrument. Furthermore, the telescope lens is laterally shiftable for alignment with said turret supported objectives.

However, when the intermediate reflector is moved to a position where it does not intercept the light beam from the microscope objective and telescope lens combination, this beam is allowed to form an image at said second focal plane, but the exact location thereof will depend upon the axial and lateral adjustments of the telescope lens. At this time during use of the instrument, it will be desirable to use any one of several different projection objectives, of magnifications corresponding to the matched eye pieces mentioned above, so that when an associated viewing screen or image receiving plate is axially adjusted to its predetermined positions, for the projection objective being employed, magnified images exactly equal to the magnifications in the corresponding eye pieces will be provided. Such equal magnifications are desirable for several reasons. For example, excellent photographing of specimens is possible without being required to watch the viewing screen while the specimen is being shifted for photographing different areas, the eye pieces at such times being useful. Also well centered and accurately focused pictures of specimens under highly magnified conditions may be made even though the image upon the viewing screen might not be as clear as when viewed through the eye pieces. Nevertheless, proper adjustment of the image receiving plate for the projection lens being employed would assure good photographic results.

To allow easy interchanging of several projection objectives to be accomplished and at the same time have proper alignment, parmagnification, and parfocality between corresponding projection objectives and eye pieces, the present invention provides in the lower hollow housing of the instrument an elongated laterally movable slide upon which said projection objectives are carried. The slide is movable along a pair of accurately formed interior guide ways to predetermined stations to selectively position any of the several objectives carried thereby in an operative position with respect to the optical axis of the instrument, established by the alignment of the telescope lens and the interchangeable microscope objectives. For this purpose, the slide is pivotally connected with rigid member extending exteriorly of the hollow housing and provided with a suitable manual control and stop means so that the slide may be readily actuated to and secured at any of its respective stations. In the present preferred embodiment of the invention, the stop means for accurately and rapidly locating the slide in any of its several predetermined positions of adjustment is located in a bracket at the side of the housing, which bracket also forms a sturdy supporting means for the slide actuating mechanism.

Even though the hollow housing, the slide, the guide ways, the actuating means, the bracket and the several stop means may be formed with the utmost of care, it is additionally desirable that each projection objective upon the slide be so mounted that it may be accurately tilted relative to the slide in any direction to render the optical axis thereof parallel to the optical axis of the instrument, be so mounted that each objective may be moved along its optical axis for properly focusing at said second predetermined focal plane while providing predetermined magnification upon the viewing screen or image receiving plate, and be so mounted that each projection objective may be adjusted transversely in any direction sufficiently to allow an accurate centering of the individual projection objectives with respect to the optical axis of the instrument when moved into operative position. The hollow housing of the instrument is furthermore, made light tight and the opening in the upper wall thereof for the light beam from the telescope lens is normally closed and controlled by a conventional shutter and timing mechanism so that dust will be excluded from the optics within the housing and so that photographic enlargements, and the like, may be readily made when using the instrument. Furthermore, the shutter mechanism is so arranged in the instrument that it may be easily removed therefrom for repair or replacement without disturbing the accurate adjustments of the optical and other parts of the instrument.

A more complete understanding of the present invention will be had from a consideration of the detailed description which follows when considered in conjunction with the accompanying drawings in which:

Fig. 2 is a vertical transverse sectional view to the instrument shown in Fig. 1;

Fig. 4 is an elevational view of means employed for selectively positioning the objectives in operative position in the instrument;

Fig. 5 is a fragmentary view taken substantially along line 5—5 of Fig. 2;

Fig. 6 is a sectional view taken substantially along line 6—6 of Fig. 5;

Fig. 7 is a sectional view taken substantially along line 7—7 of Fig. 1; and

Fig. 8 is a sectional view taken substantially along line 8—8 of Fig. 4.

Figure 1:
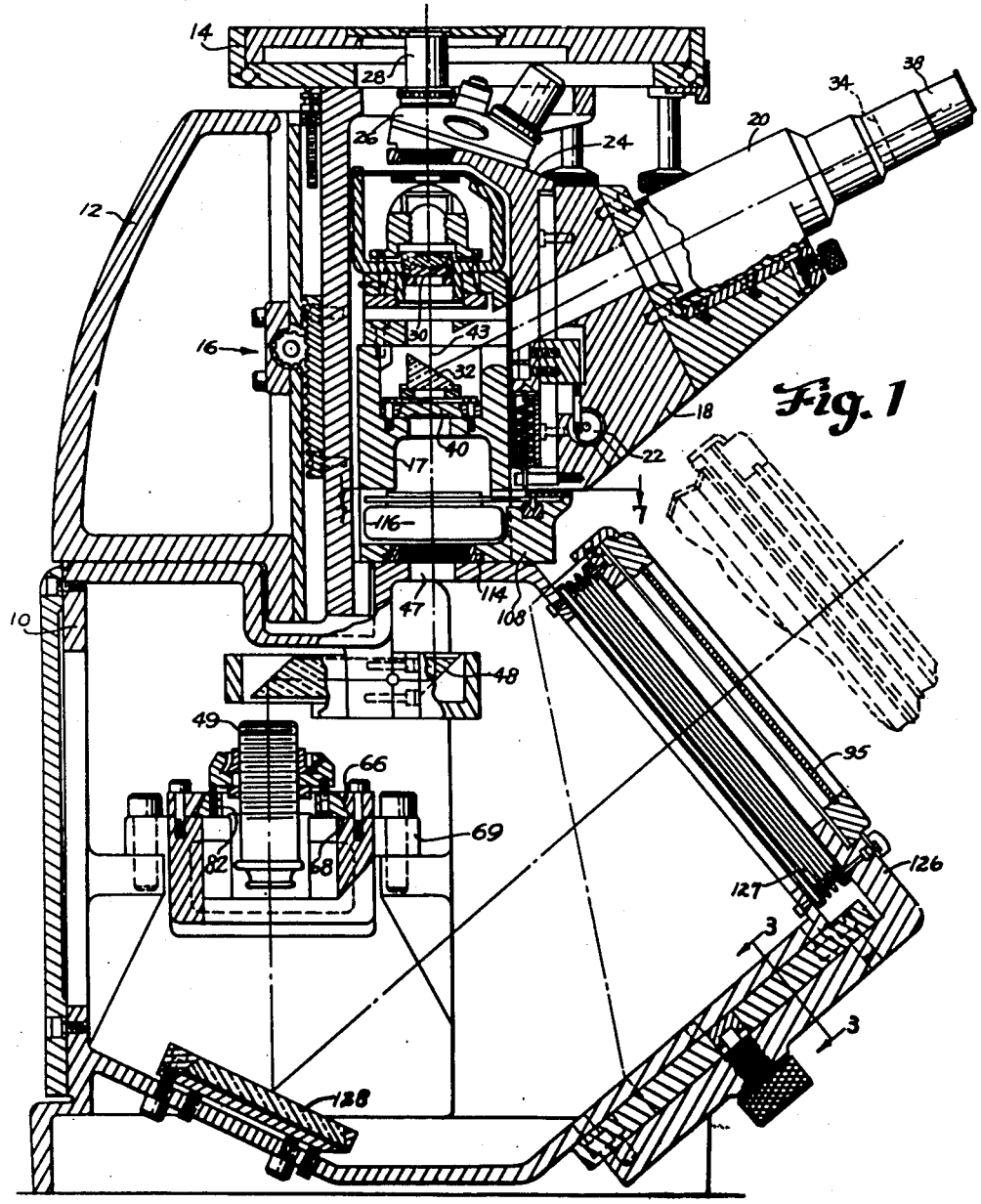
Fig. 1 is a vertical longitudinal sectional view taken substantially along the optical axis of the instrument.
Figure 3:
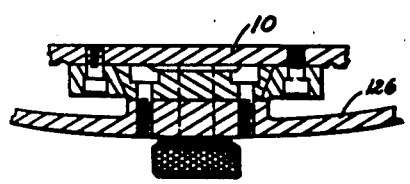
Fig. 3 is a fragmentary sectional view taken substantially along line 3—3 of Fig. 1.

Referring particularly to Figs. 1 and 2 of the drawings, it will be seen that the present invention comprises a supporting base in the form of a hollow housing 10 upon which is secured a secondary hollow housing 12. The housing 12 carries adjustably thereabove a sturdy object supporting stage 14 and this stage may be moved vertically by a conveniently located course adjustment mechanism 16. Forwardly of this adjustment mechanism is located a fixed block 17 upon which is secured a supporting bracket 18 removably carrying a body tube member 20. The bracket 18 also carries a fine adjustment mechanism 22 for moving a turret-supporting arm 24 vertically. Upon the upper end of arm 24 is pivotally mounted a turret 26 provided with a plurality of centered and parfocalized objectives any one of which may be moved into an operative position so as to focus, when properly vertically adjusted, upon an opaque object located upon the stage 14. An objective in such position is indicated by numeral 28.

In said earlier application it was pointed out that for illumination purposes and accuracy in the optical performance of the instrument, it was desirable to employ beneath the microscope objective 28, a thin semi-transparent reflector 29 and a relatively long focal length telescope lens system 30 so located with respect to said microscope objective that light from the object will pass from objective 28 to lens system 30 in the form of a parallel beam. This beam is then imaged by the latter lens system at a predetermined distance therefrom. When a reflecting member 32 is positioned so as to intercept the image forming rays from the lens system 30, an image will be formed at an image plane in the body tube and by axial adjustment of lens system 30 the image plane may be caused to coincide with a predetermined focal plane 34 in the body tube 20 which is the object plane of an eye lens 38.

If reference is made particularly to Fig. 2, it will be seen that reflector 32 is tiltably and angularly adjustably carried upon a slide 40 for locating the image at plane 34. The slide 40 may be moved by a hand control 42 out of the optical axis 43 of the instrument and simultaneously a light shield 44 and an aperture 46 in said slide 40 moved so as to surround the optical axis and allow the image forming light beam to pass downwardly, when not obstructed, and enter the housing 10 through an opening 47 in a manner to be reflected rearwardly and then downwardly by a double reflecting prism 48 to a second predetermined focal plane 49.

Upon the outside of housing 10 is provided a rigid vertical bracket 50 (see Fig. 4) which may be integral therewith or may have an attaching flange 51, an arc lamp supporting portion 52 and a vertical apertured projection 53 near its outer end for receiving a tubular member 54. The inner end of this member 54 is supported by mounting means 56 positioned upon the flange 51 or housing 10 and the outer end is supported by clamping means 57 so that an actuating rod 58 positioned in the member 54 and attached to a carrier or slide 60 by screw threads 61 may be moved inwardly or outwardly by a control shaft 62 and handle 64 extending forwardly from said rod. To allow this, the tubular member 54 is provided with an elongated semi-circular or partly-circular slot 65. The slide 60 is provided with accurately machined outer and lower edges 66 and 68 (see Fig. 1) and arranged to move transversely in guide means 69 supported by the housing 10 so as to locate any one of several different projection objectives 70, 72, 74 or 76 in operative position in optical alignment with the optical axis 43 of the instrument. Proper positioning of the slide 60 for locating each objective in its operative position is accomplished by the shaft 62 extending through a slot 78 in bracket 50 and being received and centered by any one of a plurality of notches 80 formed in a plate 81 secured to bracket 50.

If it were only desirable to selectively locate each projection objective closely beneath a reflecting surface such as prism 48 sufficiently accuracy might be accomplished by careful machining of the notches 80, the rod 58, the slide 60 and the openings 82 in the slide for the several projection objectives. However, it is of utmost importance that each projection lens system in the lower part of the instrument be accurately centered relative to the lens systems in the upper part during use of the instrument so that the image upon the viewing screen will be optically correct. For this reason, it has been found desirable to provide additional means of special construction for accurately mounting each of said projection objectives upon the slide 60.

Referring to Figs. 5 and 6, it will be appreciated that each opening 82 for the individual projection objectives is made oversized so that a pair of clamping rings 86 and 88 may be threaded onto the associated objective lens mount, such as 72 at opposite sides of an internally flanged supporting member 90 and lower ring 86 thereof may be clamped against the flange of the member 90 to lock the objective in proper position when the required adjustments have been made. The support member 90 is provided with a plurality, preferably three, circumferentially spaced push screws 92 so that the optical axis of the projection objective may be tilted until it is parallel with the optical axis 43 established by the aligned lens systems 28 and 30. An equal number of adjacent pull screws 94 are provided to lock the member 90 in place. After this has been accomplished, the objective may be screwed upwardly or downwardly within the clamping member 88, while clamping member 86 remains loose, until the projection lens system has been properly focused upon the predetermined focal plane 49 and provides upon the axially adjustable viewing screen 95 an image of a magnification equal to the corresponding eye piece 38.

The projection objective lens system may be movable transversely of the optical axis in any direction by angularly disposed push screws 96, preferably three, spaced circumferentially in the member 90 and arranged to engage a sloping surface of the ring 88. Proper adjustment of screws 96 may be employed to effect a shifting of the projection objective into axial alignment with the optical axis 43 of the instrument. Such shifting will take place by a sliding movement of the member 88 upon the support member 90 without materially effecting the other adjustments. After the desired adjustments have been effected and the alignment and magnification checked for accuracy, the ring 86 may be tightened so as to effect a clamping engagement by members 86 and 88 upon opposite sides of support member 90.

It is desirable that all parts of the instrument be of such construction that their delicate adjustments will not be disturbed. For this reason the rod 58, extending outwardly of the housing 10, is supported and guided by tubular member 54. The clamping means 57 at the outer end of the tube 54 may be in the form of nuts 87 threaded thereon so as to clamp upon opposite sides of projection 53. It will be clear that no upward or downward pressure upon the control knob 64 during use of the instrument will tend to disturb the slide 60 or affect the proper alignment of the individual projection objectives relative to the optical axis. Suitable play is provided between projection 53 and member 54 and between the member 54 and housing 10 (of flange 51) to allow proper alignment of rod 58 with the guideways for slide 60. Thus it will be seen that a sturdy, efficient and readily adjustable device for effecting proper alignment of projection objective lens systems have been provided. While a laterally movable slide has been described above, it will be appreciated that a pivoted disc or turret could be provided instead for supporting the projection objectives within the housing 10 and arranged to be actuated from the exterior thereof by gearing or the like. However, such a turret type carrier is not as desirable since it would probably necessitate that the housing 10 be of greater size.

Beneath the stationary block 18 (see Figs. 1 and 4) is located an apertured supporting member 108 which is releasably secured to spaced side portions 110 of the support 17 mounted upon the housing 10, said member 108 being secured in place by bolts or the like 112 extending through lateral projections of the member. Upon the member 108 is detachably secured by a clamping ring 114 an adjustable timing device or shutter mechanism 116 which is of conventional construction and is provided with a speed control arm 118, slot and pin connected to a laterally shiftable control arm 120 so that the shutter mechanism may be adjusted to any of the several shutter speeds and exposures ordinarily provided for such a mechanism. Extending outwardly of the device at the opposite side thereof from the control 120 is a flexible shutter actuating cable 122. A flat bar 124 screwed onto the upper portion of the member 108 serves to retain control bar 120 and cable 122, as well as arm 118, in place.

It will be seen that member 108 in place in the instrument positions the shutter mechanism in optical alignment with the lens systems 28 and 30 and directly over the opening 47 in housing 10. This shutter mechanism is provided for photographic purposes so that enlarged pictures of selected magnifications of specimens, or the like, may be made by merely placing the correct projection objective in operative position, adjusting the front 126 to its predetermined position for such magnification and removing from the front the viewing screen 95 and substituting in its place a conventional film pack attachment or cut film holder. The member 108, it should be noted, is so arranged at the front of the instrument that should it be desired to remove said mechanism for repair or replacement, it is merely necessary to remove bolts 112 and withdraw the member 108 with the mechanism attached forwardly out of the instrument while the front 126 is in its outer position with flexible bellows 127 extended. Furthermore, while in place, the member 108 and shutter mechanism will prevent dust from entering the housing 10 and thus help keep the prism 48, the projection objectives and the large mirror 128 clean.

Having described our invention, we claim:

1. An optical instrument comprising a hollow housing, an object supporting stage carried thereby, a lens system carried by and positioned outside of said housing, said lens system being arranged to project a beam of light from an object on said stage into said housing and form an image thereof at a relatively fixed predetermined focal plane therein, a carrier movably supported within said housing, a plurality of objectives supported by said carrier and adapted to be selectively moved thereby into operative positions in substantial alignment with said lens system, readily operable means in the form of an elongated rod rotatably connected to said carrier and extending outwardly through a wall of said housing and having an arm extending laterally from said rod for actuating said carrier, means to support the portion of said rod outwardly of said housing in different positions of adjustment, and comprising an elongated tube surrounding said rod and secured in fixed relation to said housing and having an elongated slot therein outwardly through which said arm extends, stop means between said housing and said carrier for retaining said arm in predetermined locations so as to secure each of said objectives in its operative position, and adjustable means for mounting each objective upon said carrier so as to be transversely and angularly movable into exact alignment with said lens system and so as to be axially movable for focusing at said predetermined focal plane when located in operative position in said housing.

2. An optical instrument comprising a hollow housing, an object supporting stage above said housing and carried thereby, an opening in an upper wall of said housing, a lens system carried by said housing and arranged to project a beam of light from an object on said stage through said opening and into said housing for forming an image of said object at a relatively fixed predetermined focal plane therein, a carrier movably supported within said housing, a plurality of objectives supported by said carrier and adapted to be selectively moved thereby into operative positions in substantial alignment with said lens system, readily operable means connected to said carrier and extending outwardly through a wall of said housing for actuating said carrier to selectively position said objectives, stop means between said housing and carrier for retaining each of said objectives in substantial alignment with said lens system, an image receiving plate and extensible means carried by and normally closing a second opening in said housing, adjustable means for mounting each objective upon said carrier so as to be transversely and angularly movable into exact alignment with said lens system when in operative position, and so as to be axially movable for focusing at said predetermined focal plane, said plate being axially movable to predetermined image receiving positions according to the objective to be used, and a light control mechanism positioned so as to normally close said first opening and adjustable by the operator of the instrument for permitting the light from said lens system to enter said housing when desired and for controlling the amount thereof.

3. An optical instrument comprising a hollow housing, an object supporting stage carried thereby, a lens system carried by and positioned outside said housing, said lens system being arranged to project a beam of light into said housing and form an image of an object on said stage at a relatively fixed predetermined focal plane therein, a carrier slidably supported within said housing for rectilinear movement, a plurality of objectives supported thereby, said carrier being adapted to selectively move said objectives into operative positions substantially aligned with said lens system, a rod connected to said carrier and extending outwardly through a wall of said housing for actuating said carrier, a bracket carried by said housing and having means slidably supporting the free end of said rod, stop means between said housing and said carrier for releasably retaining each of said objectives in substantial alignment with said lens system, and adjustable means for mounting each objective upon said carrier so as to be transversely and angularly movable into exact alignment with said lens system, and so as to be axially movable for focusing at said predetermined focal plane when located in operative position.

4. An optical instrument comprising a hollow housing, an object supporting stage carried thereby, an opening in a wall of said housing, a lens system carried by said housing and arranged to project a beam of light through said opening and into said housing for forming an image of an object on said stage at a relatively fixed focal plane therein, a carrier slidably supported within said housing for rectilinear movement, a plurality of objectives supported thereby, said carrier being adapted to selectively move said objectives into positions substantially aligned with said lens system, a rod connected to said carrier and extending outwardly through a wall of said housing for actuating said carrier, a bracket carried by said housing and having means slidably supporting the free end of said rod, stop means between said housing and said carrier for releasably retaining each of said objectives in substantial alignment with said lens system, an image receiving plate carried by said housing, adjustable means for mounting each objective upon said carrier so as to be transversely and angularly movable into exact alignment with said lens system, and so as to be axially movable for focusing at said focal plane, said plate being axially movable to predetermined image receiving positions according to the objective to be used, and a light control mechanism positioned adjacent said opening for controlling the light beam from said lens system.

5. An optical instrument comprising a hollow housing having an aperture in a wall thereof, a stage supported by said housing and arranged to support opaque objects for examination, a microscope objective adjacent said stage, means carried by said housing and arranged to support said objective for adjustment relative to said stage, a relatively long focal length lens optically aligned with said objective and axially adjustable relative thereto, a vertical illuminator between said lens and said objective for illuminating objects on the stage, said lens and said objective forming a combined optical system arranged to direct light from the object on the stage through said aperture and form an image thereof within said housing, said image being formed at a focal plane located at a fixed distance from said lens regardless of the spacing between said lens and said objective, an image receiving plate carried by said housing and movable to a plurality of different predetermined image receiving positions, a carrier movably supported within said housing, a plurality of projection objectives supported by said carrier and adapted to be selectively moved thereby into operative positions in substantial alignment with said combined optical system, readily operable means connected to said carrier and extending outwardly through a wall of said housing for actuating said carrier, stop means between said housing and said carrier for retaining each of said projection objectives in its operative position, and adjustable means for mounting each projection objective upon said carrier so as to be transversely and angularly movable into exact alignment with said combined optical system, and so as to be axially movable for focusing at said focal plane.

6. An optical instrument comprising a hollow housing having an aperture in a wall thereof, a stage supported by said housing and arranged to support opaque objects for examination, a microscope objective adjacent said stage, means carried by said housing and arranged to support said objective for adjustment relative to said stage, a relatively long focal length lens optically aligned with said objective and axially adjustable relative thereto, a vertical illuminator between said lens and said objective for illuminating objects on the stage, said lens and said objective forming a combined optical system arranged to direct light from the object on the stage through said aperture and form an image thereof within said housing, said image being formed at a focal plane located at a fixed distance from said lens regardless of the spacing between said lens and said objective, an image receiving plate carried by said housing and movable to a plurality of different predetermined image receiving positions, a carrier movably supported within said housing, a plurality of projection objectives supported by said carrier and adapted to be selectively moved thereby into operative positions in substantial alignment with said combined optical system, readily operable means connected to said carrier and extending outwardly through a wall of said housing for actuating said carrier, stop means between said housing and said carrier for retaining each of said projection objectives in its operative position, adjustable means for mounting each projection objective upon said carrier so as to be transversely and angularly movable into exact alignment with said combined optical system, and so as to be axially movable for focusing at said focal plane, and a light control mechanism positioned adjacent said aperture for controlling the light from said combined optical system.

7. An optical instrument comprising a hollow housing having an aperture in a wall thereof, a stage supported by said housing and arranged to support opaque objects for examination, a microscope objective adjacent said stage, means carried by said housing and arranged to support said objective for adjustment relative to said stage, a relatively long focal length lens optically aligned with said objective and axially adjustable relative thereto, a vertical illuminator between said lens and said objective for illuminating objects on said stage, said lens and said objective forming a combined optical system arranged to direct light from said objects through said aperture and form an image thereof within said housing, said image being formed at a focal plane located at a fixed distance from said lens regardless of the spacing between said lens and said objective, an image receiving plate carried by said housing and movable to different predetermined image receiving positions, a carrier slidably supported within said housing, a plurality of projection objectives supported by said carrier and adapted to be selectively moved thereby into operative positions in substantial alignment with said combined optical system, a rod connected to said carrier and extending outwardly through a wall of said housing for actuating said carrier, a bracket carried by said housing and having means slidably supporting the free end of said rod, stop means between said housing and said carrier for releasably retaining each of said projection objectives in its operative position, adjustable means for mounting each projection objective upon said carrier so as to be transversely and angularly movable into exact alignment with said combined optical system, and so as to be axially movable for focusing at said focal plane.

8. An optical instrument comprising a hollow housing having an aperture in a wall thereof, a stage supported by said housing and arranged to support opaque objects for examination, a microscope objective adjacent said stage, means carried by said housing and arranged to support said objective for adjustment relative to said stage, a relatively long focal length lens optically aligned with said objective and axially adjustable relative thereto, a vertical illuminator between said lens and said objective for illuminating objects on said stage, said lens and said objective forming a combined optical system arranged to direct light from said objects through said aperture and form an image thereof within said housing, said image being formed at a focal point located at a fixed distance from said lens regardless of the spacing between said lens and said objective, an image receiving plate carried by said housing and movable to different predetermined image receiving positions, a carrier slidably supported within said housing, a plurality of projection objectives supported by said carrier and adapted to be selectively moved thereby into operative positions in substantial alignment with said combined optical system, a rod connected to said carrier and extending outwardly through a wall of said housing for actuating said carrier, a bracket carried by said housing and having means slidably supporting the free end of said rod, stop means between said housing and said carrier for releasably retaining each of said projection objectives in its operative position, adjustable means for mounting each projection objective upon said carrier so as to be transversely and angularly movable into exact alignment with said combined optical system, and so as to be axially movable for focusing at said focal plane, and a light control mechanism positioned adjacent said aperture for controlling the light from said combined optical system.

9. Lens mounting means for use in an optical instrument of the character described and comprising a supporting member having a lens tube receiving aperture formed therein, an intermediate member having an aperture formed therein, means for positioning and maintaining said intermediate member adjacent said supporting member with said apertures in substantial alignment, said means comprising a plurality of pull screws each loosely carried in and a plurality of push screws each having screw threaded engagement in individual holes extending through one of said members, said push and pull screws being circumferentially spaced about said apertures and having, respectively, pressing and screw threaded engagement with the other of said members for effecting limited universal tilting adjustment of said intermediate member relative to said supporting member, tubular lens mounting means having a screw threaded external portion extending loosely through said apertures, and a pair of clamping rings threaded onto said threaded portion and having clamping engagement with opposite sides of said intermediate member.

10. Lens mounting means for use in an optical instrument of the character described and comprising a supporting member having a lens tube receiving aperture formed therein, an intermediate member having an aperture formed therein, means for positioning and maintaining said intermediate member adjacent said supporting member with said apertures in substantial alignment, said means comprising a plurality of pull screws loosely carried in and a plurality of push screws having screw threaded engagement in holes extending through one of said members, said push and pull screws being circumferentially spaced about said apertures and having, respectively, pressing and screw threaded engagement with the other of said members for effecting limited universal tilting adjustment of said intermediate member relative to said supporting member, tubular lens mounting means having a screw threaded external portion extending loosely through said apertures, a pair of clamping rings threaded onto said threaded portion and having clamping engagement with opposite sides of said intermediate member, and a plurality of inwardly directed screws carried by said intermediate member and arranged to engage circumferentially spaced side portions of one of said rings for effecting a lateral shifting of the optical axis of said lens mounting means relative to said supporting member.

11. Lens mounting means for use in an optical instrument of the character described and comprising a supporting member having a lens tube receiving aperture formed therein, an intermediate member having an aperture formed therein, means for positioning and maintaining said intermediate member adjacent said supporting member with said apertures in substantial alignment, said means comprising a plurality of pull screws loosely carried in and a plurality of push screws having screw threaded engagement in holes extending through one of said members, said push and pull screws being circumferentially spaced about said apertures and having, respectively, pressing and screw threaded engagement with the other of said members for effecting limited universal tilting adjustment of said intermediate member relative to said supporting member, tubular lens mounting means having a screw threaded external portion extending loosely through said apertures, and a pair of clamping rings threaded onto said threaded portion and having clamping engagement with opposite sides of said intermediate member, the threaded portion of said lens mounting means being of substantial length for allowing axial adjustment thereof in said rings for focusing purposes.

12. Lens mounting means for use in an optical instrument of the character described and comprising a supporting member having a lens tube receiving aperture formed therein, an intermediate member having an aperture formed therein, means for positioning and maintaining said intermediate member adjacent said supporting member with said apertures in substantial alignment, said means comprising a plurality of pull screws loosely carried in and a plurality of push screws having screw threaded engagement in holes extending through one of said members, said push and pull screws being circumferentially spaced about said apertures and having, respectively, pressing and screw threaded engagement with the other of said members for effecting limited universal tilting adjustment of said intermediate member relative to said supporting member, tubular lens mounting means having a screw threaded external portion extending loosely through said apertures, a pair of clamping rings threaded onto said threaded portion and having clamping engagement with opposite sides of said intermediate member, and a plurality of inwardly directed screws carried by said intermediate member and arranged to engage circumferentially spaced side portions of one of said rings for effecting a lateral shifting of the optical axis of said lens mounting means relative to said supporting member, the threaded portion of said lens mounting means being of substantial length for allowing axial adjustment thereof in said rings for focusing purposes and before one of said rings is rotated to effect clamping engagement upon said intermediate member.

13. An optical instrument comprising a hollow housing having an aperture formed in a wall thereof, a stage adjustably supported by said housing and arranged to support opaque objects for examination, a lens system adjacent said stage, means carried by said housing and arranged to support said lens system for adjustment relative to said housing, said lens system being arranged to direct light from said object through said aperture so as to form an image of said object at a focal plane within said housing, a projection objective supported within said housing and in substantial optical alignment with said lens system, an image receiving plate supported by and closing a relatively large opening in a side wall of said housing and adjacent said aperture, reflecting means in said housing angularly disposed so as to direct image forming rays from said projection objective toward said plate, and a light control means positioned adjacent said aperture so as to normally close said aperture and adjustable by the operator of the instrument for permitting light directed toward said aperture by said lens system to enter said housing when desired and for controlling the amount thereof, said light control means being removable from said housing without disturbing the optical alignment or adjustments of said lens system, projection objective, reflecting means or image receiving plate.

14. An optical instrument comprising a hollow housing having a light aperture in a wall thereof, a stage adjustably supported by said housing and arranged to support opaque objects for examination, a microscope objective adjacent said stage, means carried by said housing and arranged to support said objective for fine adjustment relative to said stage, a relatively long focal length lens optically aligned with said objective and axially adjustable relative thereto, a vertical illuminator between said lens and said objective for illuminating objects on said stage, said lens and objective forming a combined optical system arranged to direct light from the object on the stage through said aperture and form an image thereof within said housing, said image being formed at a focal plane located at a fixed distance from said lens regardless of the spacing between said lens and said objective, an image receiving plate carried by said housing and movable to a plurality of different predetermined image receiving positions adjacent said light aperture, a carrier movably supported within said housing and having a plurality of projection objectives of different magnifications supported by said carrier and adapted to be moved selectively thereby into optical alignment with said combined optical system, reflecting means in said housing angularly disposed so as to direct image forming rays from the projection objective aligned with said combined optical system toward said image receiving plate, and light control means positioned adjacent said light aperture for controlling the light directed toward said aperture, said light control means being removable from said housing without disturbing the optical alignment or adjustments of said combined lens system, said projection objectives, said reflecting means or said image receiving plate.

JOSEPH D. REARDON.
LESLIE J. PETERS.

REFERENCES CITED

The following references are of record in the file of this patent:

UNITED STATES PATENTS

| Number | Name | Date |
|---|---|---|
| 1,118,193 | Ferber | Nov. 24, 1914 |
| 2,209,532 | Michel | July 30, 1940 |
| 2,230,573 | Mestre | Feb. 4, 1941 |
| 2,313,639 | Hauser | Mar. 9, 1943 |
| 2,373,929 | Turrettini | Apr. 17, 1945 |
| 2,378,870 | Soetbeer | June 19, 1945 |
| 2,414,977 | Reid et al. | Jan. 28, 1947 |

FOREIGN PATENTS

| Number | Country | Date |
|---|---|---|
| 285,426 | Germany | June 30, 1915 |
| 218,409 | Switzerland | Apr. 1, 1942 |